United States Patent [19]

Ducos et al.

[11] Patent Number: 4,764,792
[45] Date of Patent: Aug. 16, 1988

[54] COPYING MACHINE WITH MODULAR ORIGINAL DOCUMENT LIGHT-IMAGE FORMING DEVICE

[75] Inventors: Michel Ducos, Escalqueus, France; Olivier Gherardi, Valleyfield, Canada; Jocelyn Demers, Côteau-Du-Lac, Canada; Gilles Demers, Grande-Ile, Canada

[73] Assignee: Duo Machinerie Corporation, Quebec, Canada

[21] Appl. No.: 89,405

[22] Filed: Aug. 26, 1987

[30] Foreign Application Priority Data

Aug. 29, 1986 [CA] Canada .................................. 517239

[51] Int. Cl.$^4$ ..................... G03B 27/32; G03B 27/52
[52] U.S. Cl. ..................................................... 355/27
[58] Field of Search ..................... 355/21, 27, 28, 50, 355/51

[56] References Cited

U.S. PATENT DOCUMENTS

| 4,259,007 | 3/1981 | Arai et al. | 355/27 |
| 4,335,956 | 6/1982 | Findeis et al. | 355/27 |
| 4,405,227 | 9/1983 | Inoue et al. | 355/27 |
| 4,593,998 | 6/1986 | Moss et al. | 355/27 X |

FOREIGN PATENT DOCUMENTS 2286417 4/1976 France .
2330035 5/1977 France .

Primary Examiner—Richard A. Wintercorn
Attorney, Agent, or Firm—Bacon & Thomas

[57] ABSTRACT

A copying machine for photographic reproduction, comprising a central unit including devices for unrolling, cutting and transporting photographic paper, a photosensitive paper exposing chamber, and a print development unit. The copying machine includes a removable module for forming a light image of an original document to be copied. A plurality of modules each adapted to form a light image of original documents of different types can be removably mounted on the central unit, whereby different types of original documents can be copied. The copying machine also comprises a removable cassette which stocks photographic paper and which is manufactured with plastic material through a thermal forming process. The cassette has two lateral walls between which a mandrel, supporting a photographic paper roll, is pressure mounted. Two felt rings are sticked on the two ends of the mandrel, and rub against the lateral walls of the cassette to prevent rotation of the mandrel by inertia and also to produce a certain tension in the paper during unrolling. A module for automatically preparing and regenerating chemical baths used in the print development unit, can be added to the copying machine.

27 Claims, 9 Drawing Sheets

4,764,792

COPYING MACHINE WITH MODULAR ORIGINAL DOCUMENT LIGHT-IMAGE FORMING DEVICE

BACKGROUND OF THE INVENTION

1. Field of the invention

The present invention relates to a copying machine having a device for producing a light image of original documents which is both modular and removable. More specifically, the present invention relates to such a copying machine for photographic reproduction.

2. Brief description of the prior art

The known, prior art copying machines used in photographic reproduction are designed for copying only one type of original document, in particular the photographs. Such prior art copying machines are unable to copy other types of original documents.

OBJECT OF THE INVENTION

The principal object of the invention is threrefore to provide a copying machine for photographic reproduction which can produce prints from various documents such as, for example, photographs, slides or video images.

SUMMARY OF THE INVENTION

According to the present invention, there is provided a copying machine for photographic reproduction, comprising:

a central unit provided with photographic paper supply means, means for positioning the photographic paper from the paper supply means in an exposure position, means for developing the photographic paper after exposure thereof, means for drying the developed, photographic paper, and means for collecting the developed and dried photographic paper, including means for transporting the photographic paper from its exposure position through the developing and drying means toward the paper collecting means; and a removable module for forming a light image of an original document to be copied.

The central unit further comprises means for supporting and positioning the removable, light image forming module, and means for exposing the photographic paper in said exposure position to the light image formed in the removable module.

Thus, the copying machine according to the present invention is made of two main parts, namely a central unit and a removable module for forming a light image of original documents. When a plurality of interchangeable, removable light image forming modules are available and each adapted to form a light image of original documents of a particular type, various types of documents can be copied by using the appropriate light image forming modules.

The latter characteristic of the copying machine according to the present invention increases its versatility. Indeed, with a single machine, one can obtain prints of original documents of various types. In the prior art, copying machines specifically adapted to each type of original document was required to obtain such prints.

The present invention also aims to provide a copying machine for photographic reproduction presenting many other advantages over the ones presently available on the market.

The above and other objects, advantages and features of the present invention will become apparent upon reading of the following non restrictive description of a preferred embodiment of the copying machine, given with reference to the attached drawings in which:

BRIEF DESCRIPTION OF THE DRAWINGS

FIG. 3 illustrates the drive mechanism of paper carriers positioned in developing tanks of the copying machine of FIG. 2a;

FIGS. 7, 8, 9 and 10 illustrate an embodiment of a cassette containing photographic paper, and included in the copying machine of FIG. 2a;

DETAILED DESCRIPTION OF THE PREFERRED EMBODIMENT

Figure 1:
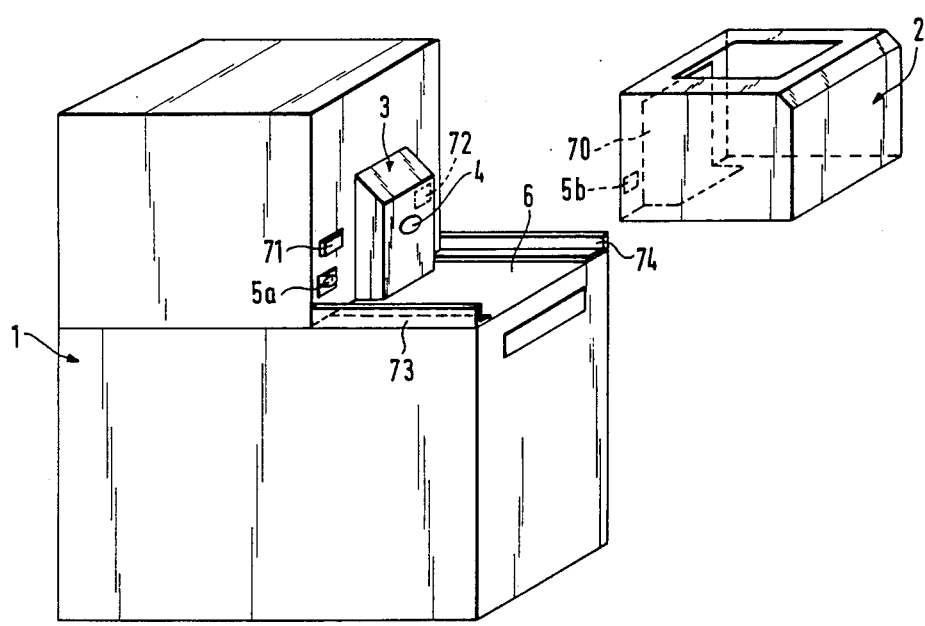
FIG. 1 illustrates one type of assembly usable for mounting the removable, light image forming module onto the central unit of the copying machine.
Figures 2A, 2B:
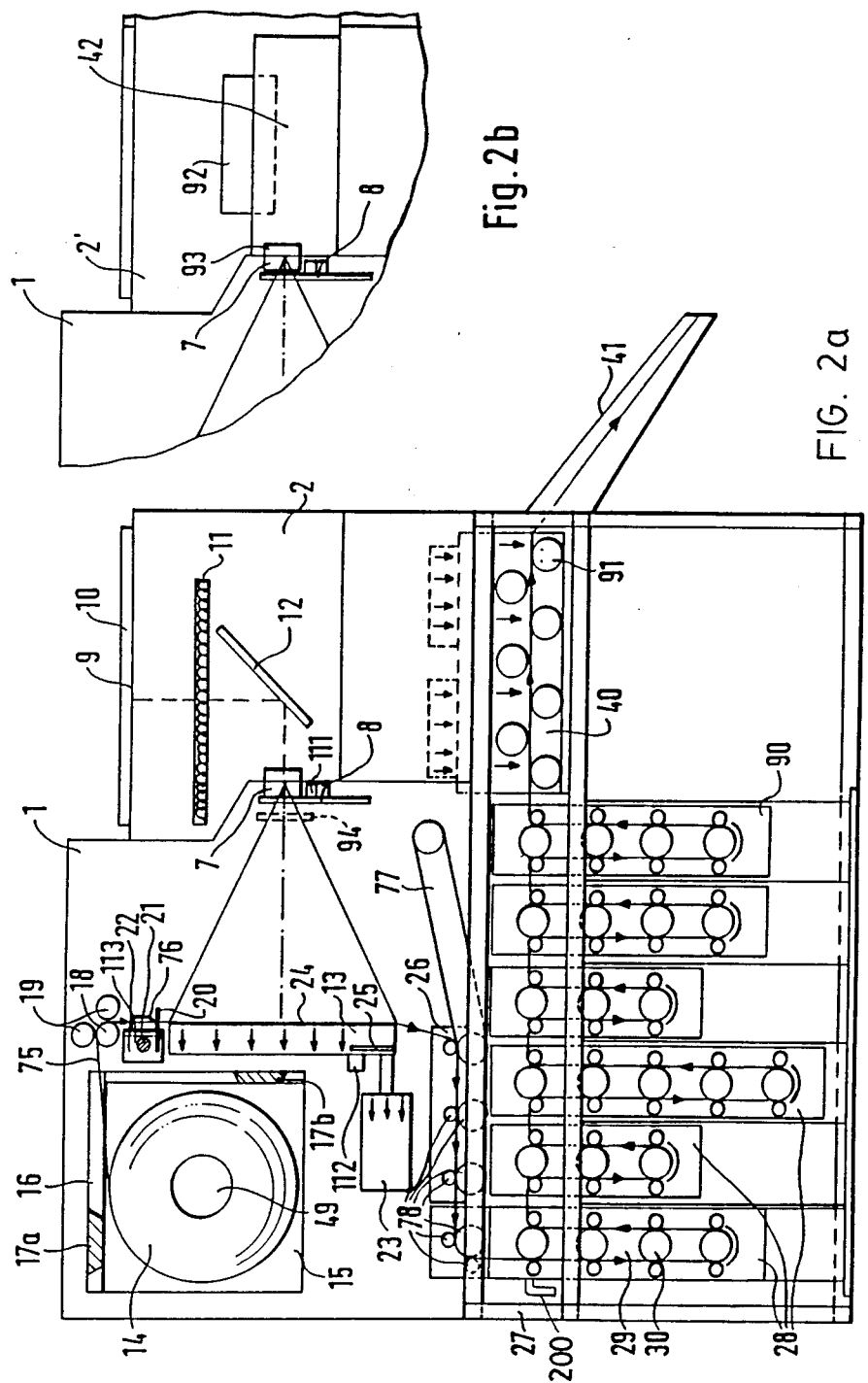
FIG. 2a shematically illustrates the global structure and operation of a copying machine according to the present invention on which is mounted a so called photocopy, light image forming module.
FIG. 2b illustrates a so called projection, light image forming module allowing the copying machine to reproduce slides on photographic paper.

As illustrated in FIGS. 1 and 2a the copying machine according to the present invention comprises a central unit 1 and a removable module 2 for forming a light image of an original document to be copied.

The central unit 1 comprises a metallic enclosure defining an horizontal surface 6 on which the module 2 is positioned. The metallic enclosure of the central unit 1 also defines an external hollow protuberance 3. The latter protuberance 3 fits into an aperture 70 made in the enclosure of the removable module 2. The latter module 2 comprises an objective 7 that, when the protuberance 3 is fitted into the aperture 70, penetrates into an orifice 4 made through the wall of the protuberance 3. Thus, the objective 7 takes place in front of a rotatable filter disk 8. An arrangement (not shown), of any suitable design, ensures lighttightness between the objective 7 and the orifice 4.

The removable, light image forming module 2 can be maintained in place onto the central unit 1 by different means such as, for example, two powerful magnets 71 and 72 mounted onto the metallic enclosure of the central unit 1, or a system including two lateral rails 73 and 74 fixed on the surface 6, on both sides of the central unit 1.

The electric power supply and also electrical control of the removable module 2 are carried out through a set of plug 5a and socket 5b, the plug 5a being automatically inserted into the socket 5b when the module 2 is positioned onto the central unit 1, for example, when the module 2 is slid on the rails 73 and 74.

The removable, light image forming module 2 illustrated in FIG. 2a is a photocopying module. The photocopying module comprises a glass 9 against which the face of the document to be photocopied is placed. Then, the document is covered by means of a cover 10. The photocopying module further includes two lamps such as 11 disposed on both sides of the module 2. When the photocopying sequence is started, the two lamps 11 illuminate the document to form a light image which is reflected and inverted by a mirror 12 and thereafter projected through the objective 7 onto the photosensitive paper.

The rotatable filter disk 8 of the central unit 1 is provided with three filters (blue, green and red), successively transversed by the light image projected onto the sheet of photographic paper during a predetemined short period of time to limit the exposure time of the photosensitive paper, and to modify the colorimetry. It can be easily appreciated that the filter disk 8 is formed by a circular plate on which are mounted the three, blue, green and red, filters which are also circular and angularly spaced apart from each other by an angle of 90° centered on the rotation axis of the filter disk. The portion of the filter disk 8 between the two farthest filters is used to block the light image after and before exposure of the photographic paper. It should be pointed out here that both a very high speed of rotation of the filter disk 8 and stopping without inertia of the disk rotation are required. For this purpose, the filter disk 8 can be rotated by means of a direct current motor with brakes 111. Should a too low rotation speed of the filter disk 8 leads to bad results, an obturator 94, positioned in front of the filter disk 8, can be used. The obturator closes to intercept the light image during positioning of the different filters.

A roll 14 of photosensitive, photographic paper is stocked in a cassette 15 positioned inside a cavity 16 formed in the central unit 1 and especially designed for this purpose. The cassette 15 is pressed into the cavity 16 by two deformable, substantially elastic members 17a and 17b, whereby the cassette 15 is firmly held in place into the cavity 16. These two pressing members 17a and 17b can be made for example of a thick layer of foam rubber having two adhesive sides. A first adhesive side of the member 17a and 17b is sticked on the internal surface of the cavity 16, while on their other adhesive side is sticked a thin metal plate which leans against the cassette 15. Thus, in order to introduce the cassette 15 into the cavity 16 which is opened on at least one side thereof the cassette is slid through the opening of the cavity 16 in the direction of the axis of the roll 14. Then, the two pressing members 17a and 17b position as required the cassette 15 into the cavity 16.

The central unit 1 further comprises a rubber, driving roller 18 rotated by a step by step motor, which rubber roller 18 pulls the photographic paper 75 stocked into the cassette and thereby unroll the paper roll 14. The paper 75 is pressed against the driving roller 18 by two other rollers 19 which form a 90° angle with respect to the roller 18 in order to increase the contact surface of the paper 75 on the roller 18.

The central unit 1 further comprises an exposure frame including a perforated plate 24 against which the paper 75 is sucked. This exposure frame defines a box 13 the inside of which communicates with a air suction device 23. The front wall of the box 13 is formed by the perforated plate 24. Between the device 23 and the inside of the box 13 is disposed an obturator 25 controlled through a solenoid 112. The obturator 25 prevents or enables circulation of air in order to release the paper 75 or to press it on the perforated plate 24. When a predetermined length of paper 75 is unrolled, the obturator 25 is opened and the device 23 sucks the air inside of the box 13 to produce a depression in this box, whereby the paper 75 is pressed against the perforated plate 24 and held in an exposure position.

After exposure of the paper 75 as described herein above, a rotatable circular cutting blade 20 is moved laterally by means of a transversal endless screw 21 rotated by means of a direct current electric motor having a rotation direction which can be reversed. The rotatable cutting blade 20 rest against an elongated fixed blade 76 during its lateral movement to properly cut the paper 75. The forth and back movement of the circular cutting blade 20 is ensured by the endless screw 21 cooperating with a nut integral with a block member 113 supporting the blade 20. During each cutting operation, the direction of rotation of the motor, and consequently of the endless screw 21, is reversed so that the paper is cut alternatively by a left to right movement of the blade 20 and a right to left movement of the same blade.

After cutting of the paper 75, the obturator 25 closes to cancel the depression in the box 13 so that the cut sheet of photographic paper falls onto a paper carrier 26 which carries the sheet toward a developing unit 27 of the copying machine. The paper carrier 26 comprises a conveyor 77 onto which the sheet of paper falls. The sheet is then guided toward carrying rollers 78 which transports it toward the developing unit 27.

As illustrated in FIG. 2a, the developing unit 27 is formed by a succession of tanks 28 filled with chemical and washing baths.

Electric heaters can be mounted in the different tanks 28 for heating the baths, when required. The activation of these heaters is conventionnally controlled by thermostats responsive to the temperature of the baths. After exposure thereof, the sheet of paper is carried from one tank to the other by means of paper carriers 29 illustrated both partially and schematically in FIG. 2a. More specifically, a paper carrier 29 is mounted in each tank 28.

Figure 4:
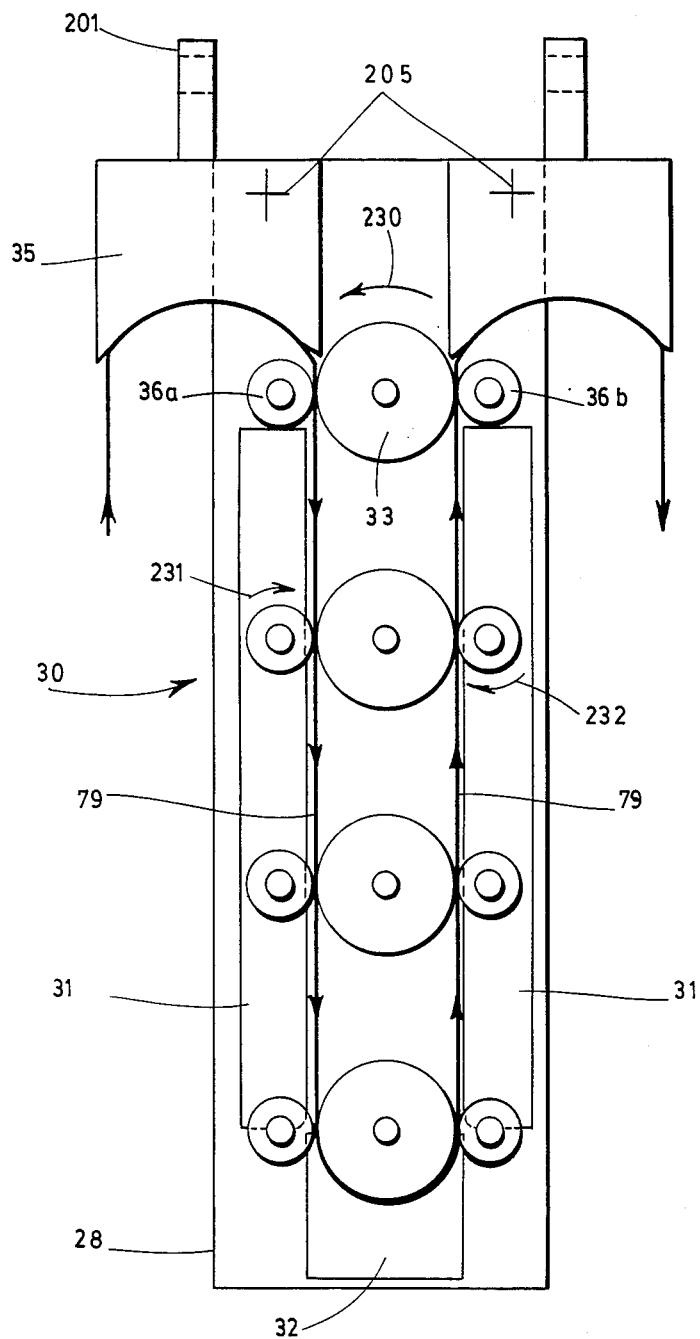
FIGS. 4, 5 and 6 illustrate in detail the structure of the paper carriers positioned in the developing tanks of the copying machine.
Figure 5:
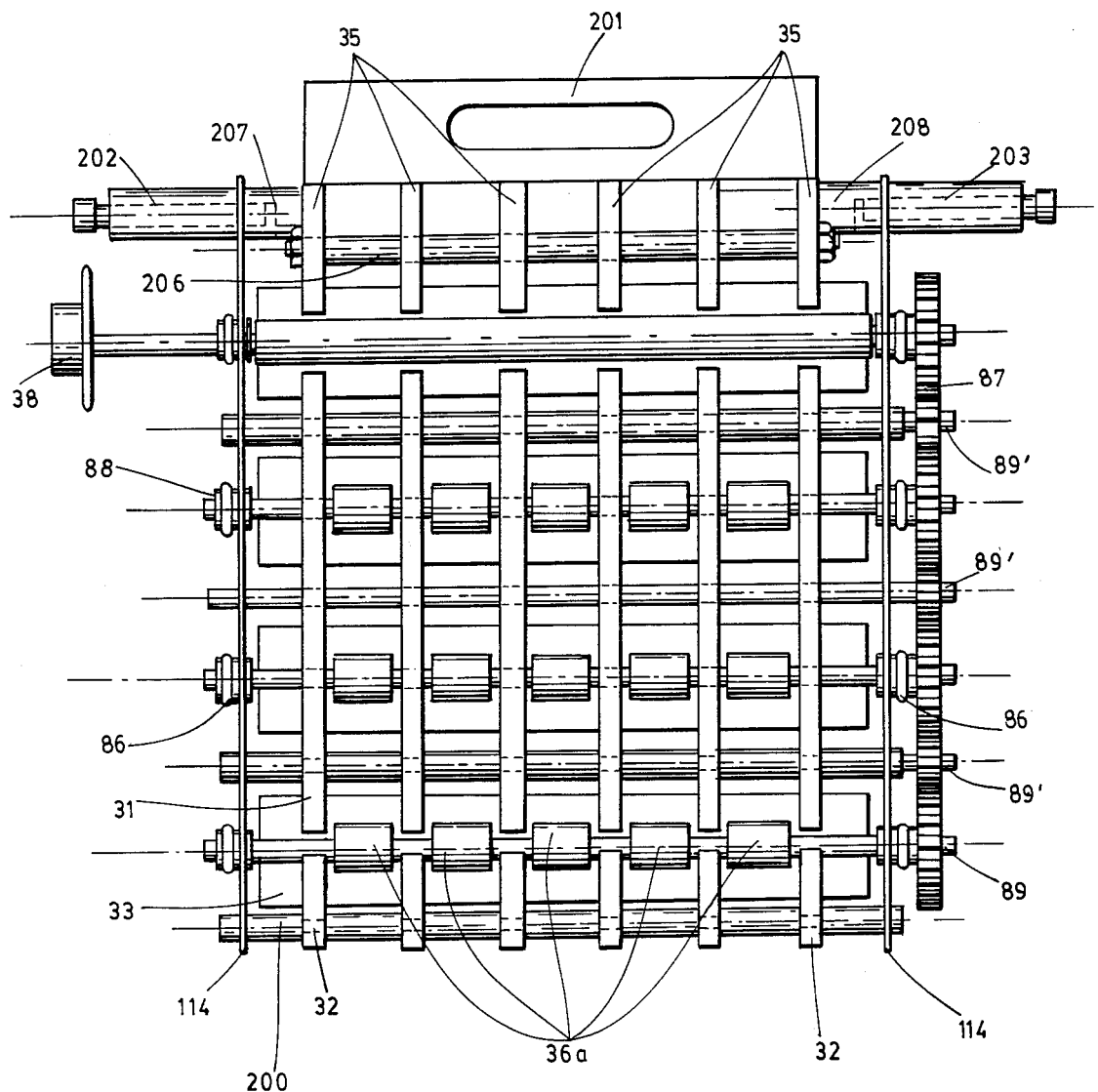
Figure 6:
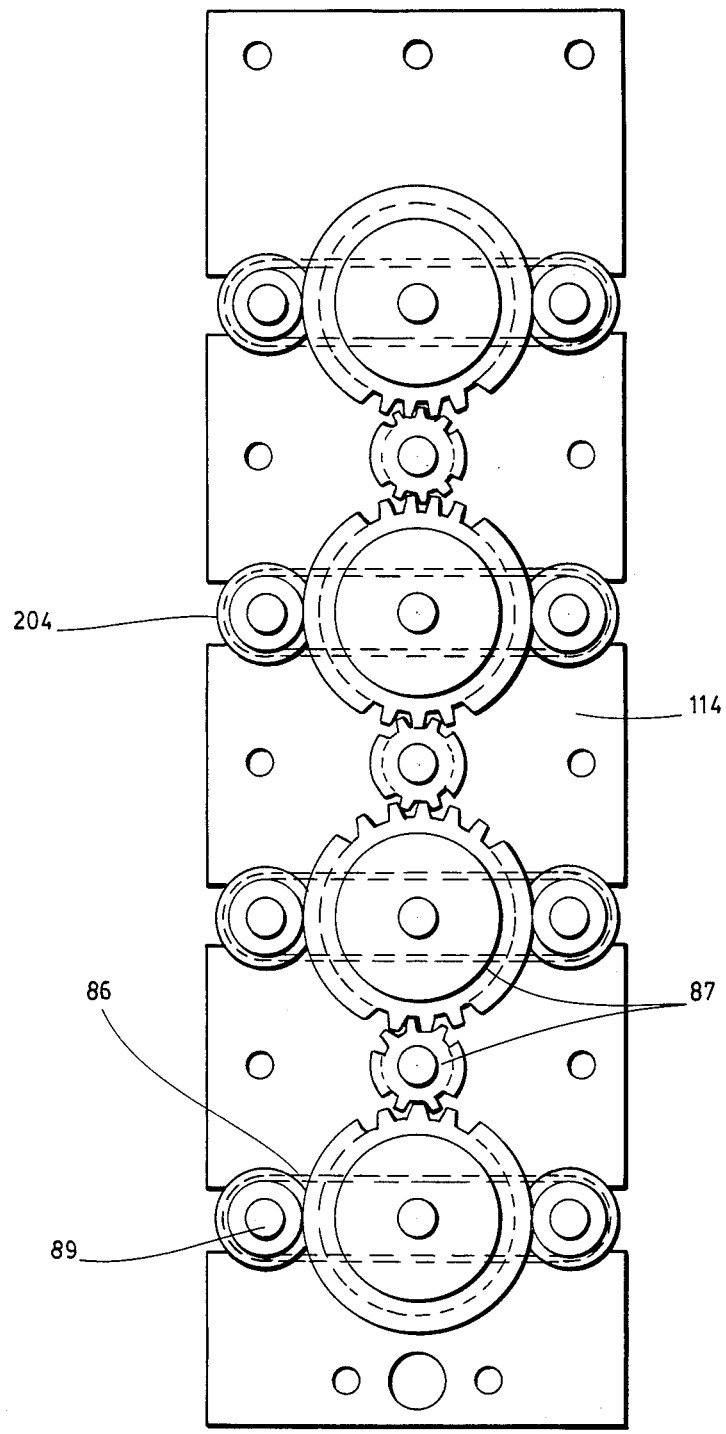

The detailed structure of each paper carrier 29 is illustrated in FIGS. 4, 5 and 6 of the attached drawings. Each of these paper carriers comprises a plurality of sets of three pressing rollers such as 30, all these sets rotating at the same speed. Each set 30 of rollers includes a median roller 33 and two lateral rollers 36a and 36b. The number of sets 30 of pressing rollers in a paper carrier depends on the height of the corresponding tank 28. As an example, four sets 30 are shown in FIGS. 4, 5 and 6. The axis of the three pressing rollers of each set 30 are positioned in a same horizontal plane, and the sets are vertically disposed one above the other.

As illustrated in FIGS. 5 and 6, each paper carrier 29 comprises two lateral, parallel support metal plates 114 between which all the rollers of the paper carrier are mounted.

Figure 3:
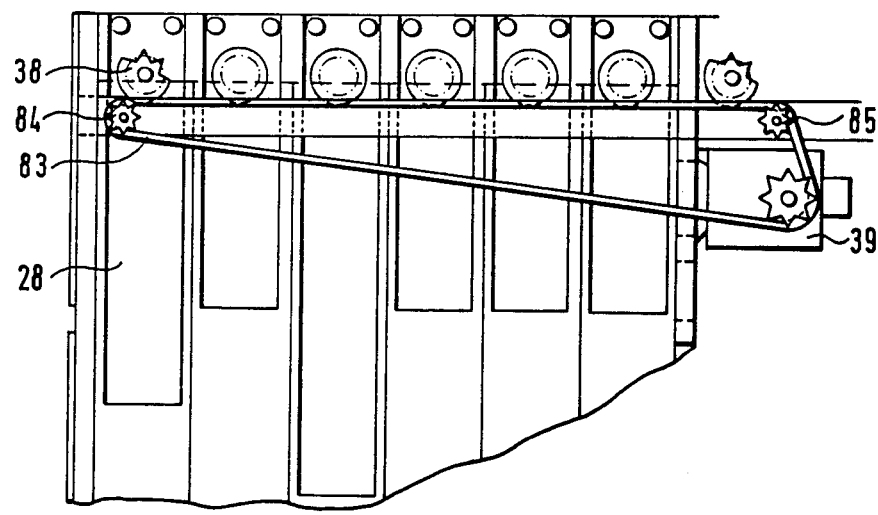

The paper carriers are drived, as shown in FIG. 3, by a pinion 38 fixed onto the axle of the median roller 33 of the upper set 30 of rollers. It should be pointed out that the axle of each median roller rotates with the median roller. The two ends of the axle of each median roller 33 are respectively mounted onto the lateral plates 114 by means of apropriate bearings. The pinions 38 engage a same chain 83 driven by an electric motor 39 so that all the paper carriers 29 rotate at the same speed. The chain 83 is guided both through two pinions 84 and 85, and through a linear guide situated between the pinions 84 and 85 so that each pinion 38 cooperates with the chain 83 for driving the paper carriers 29.

Each paper carrier comprises, on the side opposite to the pinion 38, a plurality of pinions such as 87 interconnecting the axles of the median rollers of all the sets 30 of the concerned paper carrier. Accordingly, as the axle of each median roller rotate therewith, drive of the upper median roller 33 through the pinion 38 causes rotation of all the other median rollers of the carrier and that, at the same speed and in the same direction as the higher median roller 33.

As illustrated in FIGS. 5 and 6, the ends of the axles such as 89, on which the lateral rollers 36a and 36b of each set 30 rotates, are mounted in notches such as 204 through appropriate bearings. The corresponding ends of the axles 89 of the rollers 36a and 36b of each set 30 are coupled by means of a silicone belt 86 on both sides of the paper carrier so that an adequate pressure between the median roller and the two lateral rollers of each set 30 is produced. In this respect, pulleys such as 88 are mounted at the two ends of the axles 89 of each lateral roller. Each pulley comprises an annular groove for receiving the corresponding belt 86. Accordingly, rotation of a median roller 33 also causes rotation of the associated pair of lateral rollers 36a and 36b. Each median roller 33 rotates in a direction 230 (shown in FIG. 4), each lateral roller 36a rotates in a direction 231 (shown in FIG. 4), and each lateral roller 36b rotates a direction 232 (shown in FIG. 4).

The course of the sheet of paper in each paper carrier 29 is identified by the reference numeral 79 in FIG. 4 of the drawings.

The sheet of paper is transported within each paper carrier 29 with the emulsion toward the interior as the sheet of paper falls on the conveyor 77 with the emulsion downward. Because of the natural curved shape of the sheet of paper, it tends to leave its course 79 toward the outside of the paper carrier between two successive sets 30 of rollers. To prevent the sheet of paper from leaving its course 79, a plurality of linear and vertical guides such as 31, made of rigid plastic material, are mounted on both sides of the sets 30, and are distributed along the rollers of these sets as illustrated in FIGS. 4 and 5. The function of the vertical guides 31 is obviously to guide the sheet of paper toward the junction between the median roller and one lateral roller of the next set 30 so that the paper sheet follows its course 79. Each lateral roller 36a and 36b of the three lower sets 30 (shown in FIG. 5) is formed by a plurality of short rollers such as 36a individually positioned between two adjacent ones of the guides 31. The median roller 33 of all the sets 30, and the two lateral rollers 36a and 36b of the upper set 30 are each formed by a single roller. The vertical guides 31 are fixedly mounted on each side of the paper carrier through metallic rods 89'.

Referring now to FIGS. 4 and 5 of the appended drawings, each paper carrier 29 is provided with a plurality of rigid plastic guides 32, each guide 32 having an upper guide surface defining a semi-circle centered on the rotation axis of the lower median roller 33. This semi-circle of the guides 32 receives the sheet of paper moving downward and guide it to follow the cylindrical surface of the lower median roller 33 and thereafter to move upward. As can be seen, each guide 32 is aligned with a corresponding pair of guides 31. The guides 32 are mounted between the two lateral metallic plates 114 on rods 200.

A set of guide 35 made of rigid plastic material guide the sheet of paper from one tank 28 to the other, move specifically from one paper carrier 29 to the other. These guides 35 are aligned with the vertical guides 31 and each comprise a lower guide surface defining an arc of circle. As illustrated in FIG. 4 by the course 79 followed by the sheet of paper, the sheet of paper follows the arc defined by the guides 35 when it leaves the junction between the median roller 33 and the lateral roller 36b of the upper set 30. The sheet of paper is then guided by the arc of circle of the guides 35 toward the junction between the median roller 33 and the lateral roller 36a of the upper set 30 of the next paper carrier 29. A sharp turn is thereby obtained, which sharp turn allows the sheet of paper to move rapidly toward the paper carrier 29 of the next tank 28 so that the sheet of paper penetrates rapidly into this next tank 28.

FIG. 5 shows positioning elements 202 and 203 of each paper carrier 29. Two elements 202 are mounted on a first one of the lateral support plates 114 while two elements 203 are mounted on the other one of these lateral plates 114, at the two positions identified by the reference numeral 205 in FIG. 4. The elements 202 and 203 cooperate with a corresponding frame of the central unit 1 so that the corresponding paper carrier 29 can be installed in its tank 28, The positioning elements 202 and 203 also extend inside of the lateral support plates 114.

The guides 35 of each set are assembled together by means of a rod 206. Besides, each set of guides 35 is provided with two positioning pieces 207 and with two other positioning pieces 208 respectively mounted on the two end guides 35 of the concerned set. The pieces 207 are designed for positioning on the two adjacent elements 202 of the two adjacent paper carriers 29, while the other positioning pieces 208 are designed the same two adjacent paper carriers 29, whereby the guides 35 can be easily installed. Each set of guides 35 is provided with a handle 201, which facilitates the manipulation of the sets ot guides 35.

After the print has been developed and washed in the different tanks 28, it leaves the paper carrier 29 of the last tank 90 (FIG. 2a) to penetrate in the paper carrier 40. The latter paper carrier is provided with a plurality of paper carrying rollers such as 91 and associated belts (not shown). During its passage in the paper carrier 40, a flow of warm air dries the print. The system for generating this flow of warm air is conventional and consequently, it will not be further described hereinafter. Last of all, the dried print is transferred from the paper carrier 40 to a print collecting tray 41.

As explained hereinabove with reference to FIG. 1 of the drawings, the photocopying module 2 can be easily removed from the central unit 1 and replaced by another light image forming module.

FIG. 2b shows a removable module 2' for the projection of slides, having an enclosure of the same structure as the photocopying module 2 of FIG. 1. Of course, the module 2' is mounted on the central unit 1 in the same manner as in the case of the photocopying module 2.

The projection module 2' comprises inside of its enclosure a slide projector 42 with a rotary slide tray 92. Of course, the tray 92 is accessible through an opening located on the top of the enclosure of the module 2', which opening can be closed by means of a cover. As can be seen, the projector 42 comprises an objective 93 which can be inserted in the orifice 4 (FIG. 1) to be positioned in front of the filter disk 8. Thus, the projector 42 can project light images onto the photosensitive paper held by air suction on the plate 24.

The arrangement of FIG. 2b allows automatic printing of a plurality of slides on photographic paper through control of the slide projector 42.

FIGS. 7, 8, 9 and 10 show in detail the structure of the paper stocking cassette 15 of the copying machine of FIG. 2a. The cassette 15 is formed as a hollow cube diagonally divided into two shells 43 and 44. The shell, 43 and 44 can be assembled together and separated from each other in order to close and open the cassette and allow the refill of the latter with photographic paper.

A portion of the rim (95, 96 and 97) of the shell 43 defines a two-step staggered joint 45 in which a portion 98 of the rim of the shell 44 can be fitted. A band 46 of plastic material is sticked inside of the shell 43 in the lower step 47 of the staggered joint 45. As can be seen, the width of the band 46 is substantially the same as the width of the staggered joint 45. When the shells 43 and 44 are assembled together, the portion 98 of the rim of the shell 44 is inserted between the upper step 48 of the staggered joint 45 and the plastic band 46, whereby a light-tight joint between two shells 43 and 44 of the paper stocking cassette 15 is formed.

Each one of the shells 43 and 44 is made by means of a thermal forming process. The A.B.S. can be used as plastic material. The A.B.S. should however be thick enough to remain opaque after stretching so as to ensure light-tightness of the paper stocking cassette 15.

Figure 7:
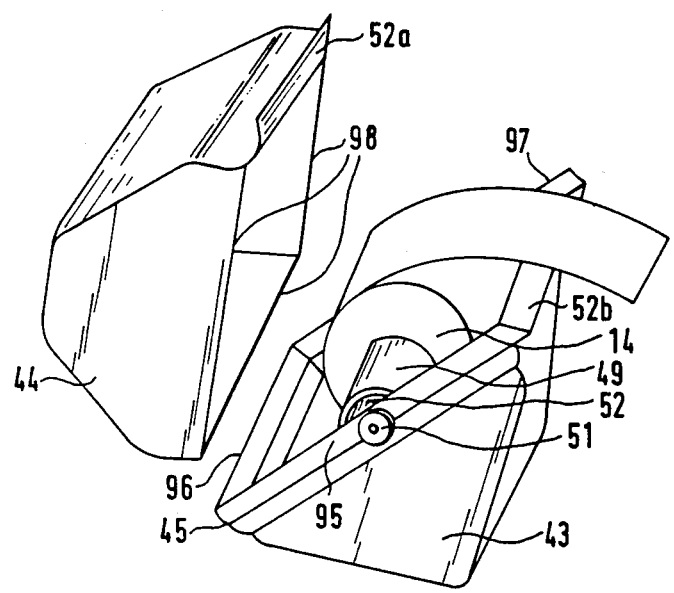

As illustrated in FIG. 7, the roll 14 of photographic paper is supported by a mandrel 49 which is pressure mounted between the lateral walls of the shell 43, by deformation of the latter walls. The mandrel 49 has its two ends respectively fixed to the lateral walls of the shell 43 at the level of the staggered joint 45 by means of two fixation screws 51 both permitting rotation of the mandrel 49 and defining a pulley on the outside of the shell 43. Annular felt rings 52 are sticked on the two ends of the mandrel 49, and rub against the inside of the lateral walls of the shell 43 when the roll 14 and the mandrel 49 rotate. This arrangement prevents rotation of the mandrel 49 by inertia and also produces a certain tension in the paper during unrolling thereof by the rollers 18 and 19 (FIG. 2a).

Figure 10:
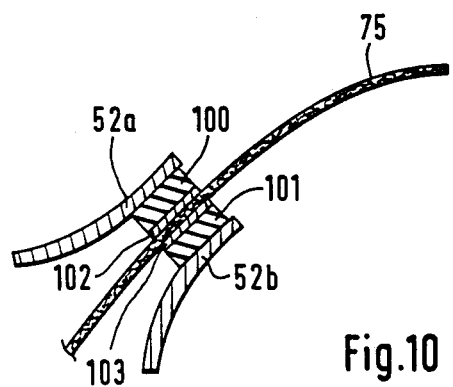

FIG. 10 illustrates in detail the paper exit of the cassette 15. The edge 52a of the shell 44 and the edge 52b of the shell 43 are curved toward the outside of the cassette 15 to form an elongated aperture. A band 100 of foam rubber has a first adhesive side sticked against the edge 52a of the shell 44, while another band 101 also of foam rubber has an adhesive side sticked against the edge 52b of the shell 43. Two felt bands 102 and 103 are respectively fixed on the second side of the bands 100 and 101 lined with adhesive. The photosensitive paper can therefore slide between the two felt bands 102 and 103, while the lighttighness of the aperture formed by the edges 52a and 52b of the cassette is ensured.

Figure 8:
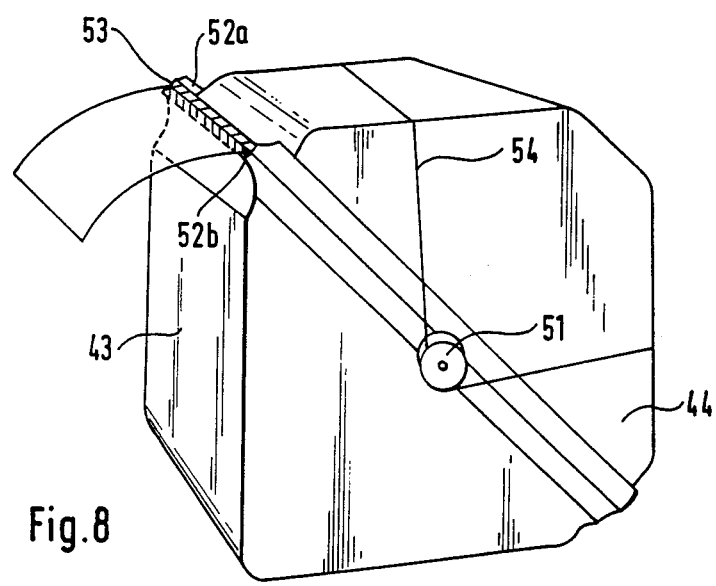
Figure 9:
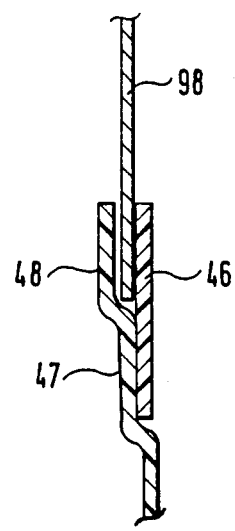

FIG. 8 presents a closure mode of the cassette 15. Such a mode is carried out by a tensioned belt 54 girding the shell 44 and fastened on each side of the cassette 15 by insertion thereof in the annular groove of the pulleys formed by the fixation screws 51.

One can easily appreciate that the paper stocking cassette described hereinabove can be manufactured at low cost. Firstly, this will allow the user to purchase a plurality of cassettes to eliminate the tedious changes of type of paper in dark room. Indeed, if each cassette contains a different type of photographic paper, the user has only to change the paper stocking cassette to change the type of photographic paper. Secondly, such cassettes can be sealed with a roll of photographic paper therein to constitute disposable low cost paper stocking cassettes. When the paper stocking cassette is empty the user has only to purchase a new cassette. A dark room to allow the user to refill the cassettes with photosensitive paper would be no more necessary.

The copying machine according to the present invention may further comprise a module for preparing and regenerating the chemical baths in the tanks 28 of FIG. 2a.

It is well know in the art that the chemical baths used in a copying machine for photographic reproduction deteriorate with both time and the number of developed prints.

Accordingly, the user of the machine has to prepare new chemical mixtures and to introduce the fresh mixtures in the corresponding tanks 28 after emptying thereof. Another alternative, according to the present invention, consists in compensation for the drop in efficiency of the baths by injecting therein chemical mixtures of higher concentration.

In order to carry out the latter alternative, the copying machine comprises a module for the preparation and regeneration of the baths. With this module, the above described manipulations, namely the preparation of new chemical mixtures and the introduction thereof in the tanks 28, are eliminated. The developing and washing baths are automatically regenerated without any intervention from the user. In addition, the standard of quality of the photographic reproduction of the copying machine is maintained.

Figure 11:
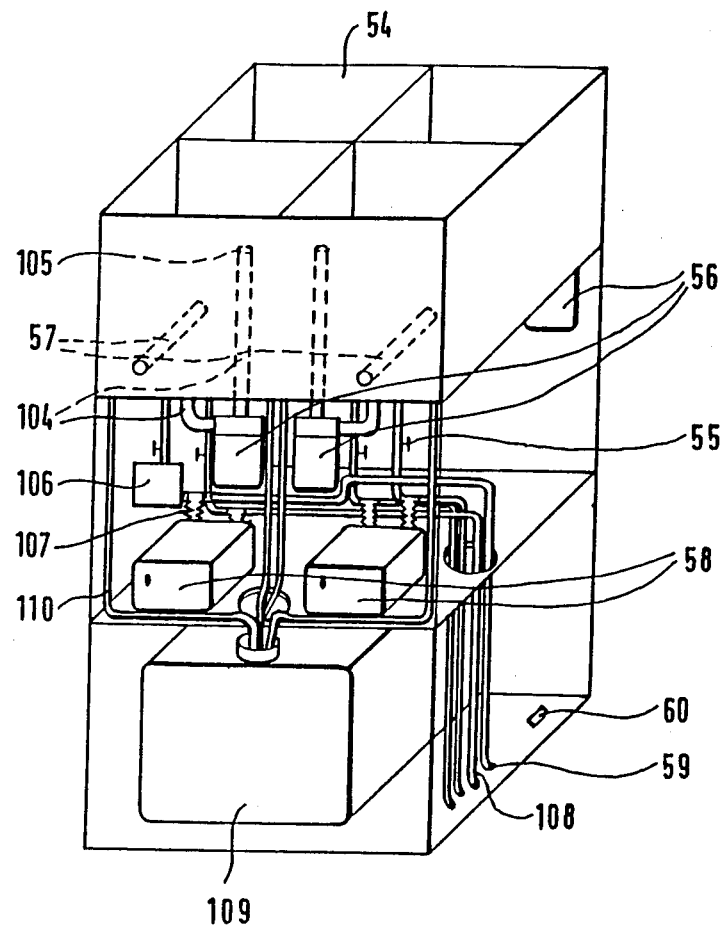
FIG. 11 is a schematic diagram of the structure of a module which can be associated with the copying machine, for preparing and regenerating chemical baths used in the development of prints produced by the copying machine according to the present invention.

As illustrated in FIG. 11, the module for preparing and regenerating the baths comprises transparent tanks such as 54 provided with a graduated scale on their outside surface. Each tank 54 is associated with a corresponding chemical mixture and is used for mixing the same. Of course, the number of tanks 54 corresponds to the required number of chemical baths.

When the chemical baths are prepared, the taps such as 55 are closed. Then, the user fills the different tanks 54 with water and with required quantities of the other constituents of the chemical mixtures.

A plurality of pumps 56 mix the baths in the different tanks 54 by pumping the liquid through an orifice located in the bottom of each tank 54 and by returning the pumped liquid in the tank through an upper outlet 105 of a pipe such as 104. Each pump 56 therefore sucks the liquid from the lower part of the corresponding tank 54 and returns it in the tank through the corresponding outlet 105, and that without oxidizing the liquid when the orifice 105 is immerged.

A heating device such as 57 is mounted in each tank 54 to heat the liquid during the mixing process, if required. Such heating device 57 can advantageously comprise at least one electric, heating resistor energized through the control of a thermostat sensing the temperature of the liquid in the corresponding tank 54.

After the chemical baths in the tanks 54 have been prepared and mixed, the taps 55 are opened. Intermediate tanks such as 106 are then each filled with the chemical mixture of the corresponding tank 54. For the purpose of simplifying the drawings, only one of the intermediate tanks 106 has been illustrated in FIG. 11.

Determined amounts of chemical mixture are transferred through conduits such as 108, from the intermediate tanks 106 to the corresponding tanks 28 of the central unit 1 by pumps such as 107 operated in function of the number of developed prints by appropriate electromechanical devices such as 58. Of course, the fresh chemical mixtures are introduced in the lower part of the tanks 28, which tanks 28 are each provided with an overflow pipe such as 200 shown in part in FIG. 2a for transferring excessive liquid from the tank 28 to a liquid collecting drum 109 situated in the lower portion of the module of FIG. 11. Obviously, conduits are provided to connect the ends such as 59 of the pipes 108 to the lower parts of the tanks 28, whereby chemical mixture of higher concentration can be injected in these tanks.

Further pipes such as 110 connect the lower part of the tanks 54 to the drum 109 in order to drain, when desired, the liquid from the tank 54 into the liquid collecting drum 109. Of course, two way valves (not shown) conduct the liquid from each tank 54 toward the pipes 110 when positioned in a first position, or toward the pipes interconnecting the taps 55 to the tanks 54, when positioned in a second position.

An electric connector 60 connects the module of FIG. 11 to the electronic control and the power supply source of the copying machine. The electronic control counts the number of pulses generated by a transducer in response to the rotation of the roller 18 (FIG. 2a) so as to determine the surface of developed photographic paper, and controls the module of FIG. 11 in relation to this information through the connector 60 so as to inject in the tanks 28 of the central unit the required amount of fresh chemical mixtures, when it is needed.

The electronic control of the copying machine, which may obviously comprise a microprocessor, carries out a centralized control of all the functions of the central unit 1, of the module of FIG. 11, and of the original document light image forming module. Of course, such a control must include all the sensors and interfaces required for the supervision and control of the whole functionning of the copying machine, for example, to energize and deenergize the different electric motor. As such an electronic control is well know in the art and does not constitute an object of the present invention, it does not appear necessary to describe it in further detail.

Although the present invention has been described hereinabove by means of a preferred embodiment thereof, it should be pointed out that any modification to such an embodiment, within the scope of the appended claims is not deemed to change the nature and scope of the present invention.

What is claimed is:

1. A copying machine for photographic reproduction, comprising:
    a central unit provided with photographic paper supply means, means for positioning said photographic paper from said paper supply means in an exposure position, means for developing said photographic paper after exposure thereof, means for drying said developed, photographic paper, and means for collecting said developed and dried paper, including means for transporting said photographic paper from said exposure position through said developing and drying means toward said paper collecting means; and
    a removable module for forming a light image of an original document to be copied;
    wherein said central unit further comprises means for supporting and positioning said removable, light image forming module, and means for exposing said photographic paper in said exposure position to the light image formed in said removable module.

2. A copying machine as defined in claim 1 wherein said removable, light image forming module is provided with an objective, and wherein said central unit comprises an enclosure having an orifice in which said objective is introduced, said light image being projected onto said photographic paper in said exposure position through said objective and, therefore, through said orifice.

3. A copying machine as defined in claim 1, wherein said central unit and said removable module each comprise an enclosure, and wherein said means for supporting and positioning said removable, light image forming module includes an horizontal surface formed by the enclosure of said central unit, and a protuberance formed on a substantially vertical surface of the enclosure of said central unit, said horizontal and substantially vertical surfaces being adjacent, the enclosure of said removable module having an aperture in which said protuberance fits when said removable, light image forming module is positioned on said central unit.

4. A copying machine as defined in claim 1, wherein said means for supporting and positioning said removable, light image forming module comprises a pair of rails.

5. A copying machine as defined in claim 3, wherein said means for supporting and positioning said removable, light image forming module comprises powerful magnets for maintaining said removable module in place.

6. A copying machine as defined in claim 1, wherein said removable module comprises means for forming a light image of a photograph constituting said original document.

7. A copying machine as defined in claim 1, wherein said removable module comprises means for forming a light image of a photographic slide constituting said original document.

8. A copying machine as defined in claim 1, herein said photographic paper developing means comprises tanks filled with chemical baths and washing baths, said photographic paper transporting means including in each of said tanks a paper carrier comprising:
    a pair of lateral supporting members;
    a plurality of sets of rotating rollers, said roller sets being disposed one above the other, and each of said rollers having two ends fixed to said two lateral supporting members respectively; and
    means for guiding the photographic paper from one set of rollers to the next one of said roller sets during transport of said photographic paper.

9. A copying machine as defined in claim 8, herein said photographic paper guiding means comprises elongated and vertical guides disposed on both sides of said sets of rotating rollers.

10. A copying machine as defined in claim 1, wherein said photographic paper developing means comprises tanks filled with chemical baths and washing baths, and wherein said photographic paper transporting means comprises:
    a paper carrier in each of said tanks, each paper carrier having an upper set of three rotating rollers including a median roller and two lateral rollers positioned on both sides of said median roller, said lateral rollers being in contact with said median roller; and means for guiding said exposed photographic paper from a junction between the median roller and one of the lateral rollers of the upper set of rollers of the paper carrier of one of said tanks toward a junction between the median roller and one of the lateral rollers of the upper set of rollers of the paper carrier of a next one of said tanks.

11. A copying machine as defined in claim 10, wherein said photographic paper guiding means comprise a plurality of guides distributed along the upper sets of rollers of the two paper carriers, each of said guides defining a curved guiding surface.

12. A copying machine as defined in claim 1, wherein said photographic paper supply means comprises means for stocking a roll of photographic paper including (a) a cassette made of plastic material and defining two lateral walls, and (b) a rotating mandrel for supporting said photographic paper roll, said mandrel being pressure mounted between said two lateral walls of the cassette by deformation of said lateral walls.

13. A copying machine as defined in claim 12, wherein said photographic paper supply means comprises means for unrolling said photographic paper roll, and means for cutting said photographic paper.

14. A copying machine as defined in claim 12, wherein said mandrel comprises two ends, and wherein said paper supply means further comprises two annular pieces of felt respectively sticked on the two ends of said mandrel, said annular pieces of felt rubbing against the lateral walls of said cassette for preventing rotation of said mandrel by inertia, and for producing a tension in said photographic paper upon unrolling of said photographic paper roll.

15. A copying machine as defined in claim 12, wherein said cassette is made through a thermal forming process.

16. A copying machine as defined in claim 15, wherein said plastic material constituting said cassette is A.B.S.

17. A copying machine as defined in claim 12, wherein said cassette comprises:
a lower portion forming a container and including an aperture delimited by a rim of said lower portion, said rim defining on a portion thereof a staggered joint having an upper step and a lower step; and
an upper portion forming a cover for said lower portion, said upper portion being designed to fit on the upper step of said staggered joint.

18. A copying machine as defined in claim 17, wherein said lower portion of the cassette comprises, in order to ensure light-tightness of said cassette, a band having a width which is substantially the same as that of the staggered joint, said band extending along and being fixed on said lower step of the staggered joint so as to form with said upper step a groove, said upper portion of the cassette defining a rim having a portion thereof designed to fit in said groove.

19. A copying machine as defined in claim 17, wherein said upper portion of the cassette comprises an edge curved toward the outside of the cassette, and wherein said lower portion of the cassette also comprises an edge curved toward the outside of the cassette, said curved edges defining an aperture, said cassette further comprising means positioned in said aperture for ensuring light-tightness of the cassette while allowing sliding of said photographic paper outside of said cassette through said aperture and therefore unrolling of said photographic paper roll.

20. A copying machine as defined in claim 19, wherein said light-tightness ensuring means, positioned in said aperture, comprises at least one band made of felt and fixed on one of said curved edges.

21. A copying machine as defined in claim 17, wherein said lower and upper portions of said cassette have the shape of a shell.

22. A copying machine as defined in claim 21, wherein the cassette comprises two pulleys, each provided with an annular groove, attached on the outside of opposite walls of said lower portion of the cassette, and a belt girding said upper portion and fastened to the two pulleys by insertion thereof in the annular grooves of said two pulleys.

23. A copying machine as defined in claim 1, wherein said developed and dried photographic paper collecting means comprise a tray.

24. A copying machine as defined in claim 1, wherein said photographic paper developing means comprises tanks filled with chemical baths, and wherein said copying machine comprises a module for preparing and regenerating said chemical baths, said bath preparing and regenerating module including for each chemical bath:
a tank for the preparation of the bath, which preparation consisting of pouring in the bath preparation tank the different constituents of the bath and of mixing said constituents;
an intermediate tank connected to said bath preparation tank through a tap, said tap being closed during preparation of the bath and opened when the preparation of the bath is completed so that said intermediate tank is filled with the chemical bath after completion of its preparation; and
a pump, interposed between said intermediate tank and the tank of said photographic paper developing means filled the bath, for injecting determined amounts of the bath stocked in said intermediate tank into the tank of the photographic paper developing means and thus regenerating the bath of the tank of said photographic paper developing means, the tank of the photographic paper developing means being provided with an overflow for draining excessive bath from the latter tank.

25. A copying machine as defined in claim 24, wherein said bath preparing and regenerating module comprises an electric connector connected to said central unit so that said central unit can control said pumps in relation to the surface of photographic paper developed by said 26. A copying machine as defined in claim 24, wherein said bath preparing and regenerating module includes at least one mixing pump for mixing the constituents of said baths in said bath preparation tanks.

27. A copying machine as defined in claim 24, wherein said bath preparing and regenerating module comprises means for heating said baths to a predetermined temperature during the preparation thereof.

* * * * *